(12) United States Patent
Larsson et al.

(10) Patent No.: US 8,638,868 B2
(45) Date of Patent: Jan. 28, 2014

(54) METHODS AND APPARATUS FOR VARYING REDUCED TRANSMISSION RESOURCES

(75) Inventors: Daniel Larsson, Solna (SE); Dirk Gerstenberger, Stockholm (SE); Lars Lindbom, Karlstad (SE); Iana Siomina, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 221 days.

(21) Appl. No.: 13/163,876

(22) Filed: Jun. 20, 2011

(65) Prior Publication Data

US 2012/0020421 A1 Jan. 26, 2012

Related U.S. Application Data

(60) Provisional application No. 61/357,797, filed on Jun. 23, 2010.

(51) Int. Cl.
*H04K 1/10* (2006.01)

(52) U.S. Cl.
USPC .......................................................... 375/260

(58) Field of Classification Search
USPC .......................................................... 375/260
See application file for complete search history.

(56) References Cited

U.S. PATENT DOCUMENTS

| 7,983,145 | B2 * | 7/2011 | Frenger | 370/208 |
| 2010/0111209 | A1 * | 5/2010 | Frenger | 375/260 |
| 2011/0080838 | A1 | 4/2011 | Larsson | |
| 2011/0081865 | A1 * | 4/2011 | Xiao et al. | 455/63.1 |
| 2011/0105135 | A1 * | 5/2011 | Krishnamurthy et al. | 455/450 |

OTHER PUBLICATIONS

PCT Search Report, mailed Sep. 30, 2011, in connection with International Application No. PCT/SE2011/050825.
Second Written Opinion, mailed Jun. 5, 2012, in connection with International Application No. PCT/SE2011/050825.
International Preliminary Report on Patentability, mailed Aug. 9, 2012, in connection with International Application No. PCT/SE2011/050825.
Catt: "Considerations on Interference Coordination in Het-Net" 3GPP Draft; R1-100902, RAN WG1, San Francisco, CA, USA, Feb. 16, 2010, XP050418504.
Huawei: "Enhanced ICIC and Resource-Specific CQI Measurement" 3GPP Draft; R1-103127, RAN WG1, Montreal, Canada, May 4, 2010, XP050420196.
ETRI: "Enhancement of Rel-8/9 ICIC mechanisms considering relays" 3GPP Draft; R1-103882, RAN WG1, Dresden, Germany, Jun. 22, 2010, XP050449280.
3GPP TR 36.921, V9.9.0, Technical Specification Group Radio Access Network; Evolved Universal Terrestrial Radio Access (E-UTRA); FDD Home eNode B (HeNB) Radio Frequency (RF) requirements analysis (Release 9), Apr. 6, 2010, XP050402484.

(Continued)

*Primary Examiner* — Jaison Joseph
(74) *Attorney, Agent, or Firm* — Coats and Bennett PLLC

(57) ABSTRACT

Inter-cell interference coordination across layers of a communication network can be implemented by configuring a cell to transmit one or more downlink transmission resources having variably reduced transmission activity. A transmitting node, such as a macro cell, can transmit transmission resources, such as resource elements, resource blocks, subframes, and frames, having reduced transmission activity at varying predictable times according to a selected cell activity pattern. A receiving node, such as a user equipment, can decide to make received signal measurements according to the cell activity pattern.

45 Claims, 6 Drawing Sheets

(56) References Cited

OTHER PUBLICATIONS

Huawei: "Some results on DL coordinated beam switching for interference management in LTD Advanced" 3GPP Draft; R1-084352, Prague, Czech Republic, Nov. 4, 2008, XP050317623.

3GPP TS 36.331, V9.3.0, Technical Specification Group Radio Access Network; Evolved Universal Terrestrial Radio Access (E-UTRA); Radio Resource Control (RRC); Protocol specification (Release 9), Jun. 2010.

3GPP TS 36.211, V8.9.0, Technical Specification Group Radio Access Network; Evolved Universal Terrestrial Radio Access (E-UTRA); Physical Channels and Modulation (Release 8), Dec. 2009.

Ericsson et al. "Further considerations on non-CA based enhanced ICIC" 3GPP TSG-RAN WG1, R1-104064, Dresden, Germany Jun. 28-Jul. 2, 2010.

3GPP TS 23.272, V8.8.0 Technical Specification Group Services and System Aspects; Circuit Switched (CS) fallback in Evolved Packet System (EPS); Stage 2 (Release 8), Jun. 2010.

3GPP TS 23.204, V10.2.0 Technical Specification Group Services and System Aspects; Support of Short Message Service (SMS) over generic 3GPP Internet Protocol (IP) access; Stage 2 (Release 10), Sep. 2010.

3GPP TS 23.040, V8.6.0 Technical Specification Group Core Network and Terminals; Technical realization of the Short Message Service (SMS) (Release 8), Sep. 2009.

3GPP TS 23.271, V8.1.0 Technical Specification Group Services and System Aspects; Functional stage 2 description of Location Services (LCS) (Release 8), Dec. 2009.

\* cited by examiner

METHODS AND APPARATUS FOR VARYING REDUCED TRANSMISSION RESOURCES

This application claims the benefit of the filing date of U.S. Provisional Patent Application No. 61/357,797 that was filed on Jun. 23, 2010, and that is incorporated here by reference.

TECHNICAL FIELD

This invention relates to wireless communication networks and more particularly to transmitted signal pattern design in such networks.

BACKGROUND

Improved support for heterogeneous cellular communication network operations is part of the ongoing specification of a Long Term Evolution (LTE) communication system by the Third Generation Partnership Project (3GPP) in its Release 10 Technical Specifications (TS) and later Releases. 3GPP technical specifications for LTE networks can be seen as an evolution of the technical specifications for current wideband code division multiple access (WCDMA) networks. An LTE network is sometimes also called an Evolved Universal Terrestrial Radio Access (E-UTRA) Network (E-UTRAN). A heterogeneous communication network has a mixture of cells of differently sized and overlapping coverage areas.

FIG. 1 depicts an example of a heterogeneous network 100 that includes three non-overlapping pico cells 110, 112, 114 deployed within the coverage area of a macro cell 120. It will be understood that the network 100 typically includes more than one macro cell 120, each of which can have zero, one, or more pico cells. Examples of pico cells and similar low-power nodes in heterogeneous networks are home base stations and relay nodes. As discussed below, the large difference in transmitted output power between a macro cell (e.g., +46 dBm) and a pico cell (e.g., less than +30 dBm) results in an interference situation different from that seen in networks in which all cells, or radio access network (RAN) nodes, have the same output power. In an LTE network, RAN nodes are generally called evolved NodeBs (eNodeBs, or eNBs).

Aims of deploying low-power nodes such as pico base stations within a macro cell's coverage area are to improve system capacity by cell splitting gains and to provide users with wide area experience of high speed data access throughout the network. Heterogeneous network deployments can be particularly effective by covering traffic hotspots, i.e., small geographical areas with high user densities, with pico cells, and they represent an alternative to deploying a denser macro-cell network.

A simple way to operate a heterogeneous network is to use different radio frequencies in the network's different layers to avoid radio interference between the layers. Thus in the network depicted by FIG. 1, the macro cell 120 and pico cells 110, 112, 114 would use different, non-overlapping carrier frequencies. With no macro-cell interference toward the underlying pico cell(s), cell splitting gains are achieved when all radio resources can simultaneously be used by all underlying pico cells. Nevertheless, a drawback of having network layers use different carrier frequencies is that it can lead to inefficient resource utilization. For example, when resource usages in the pico cells are low, it can be more efficient to use all carrier frequencies in the macro cell, thereby essentially switching off the pico cells. This is not typically possible, however, because the allocation of carrier frequencies across layers is typically fixed.

Another (related) way to operate a heterogeneous network is to share radio resources on a carrier by coordinating transmissions across the network layers, which is to say, by coordinating transmissions in the macro cell and underlying pico cells. This can be called inter-cell interference coordination (ICIC), in which certain radio resources are allocated to a macro cell during certain time periods, thereby enabling remaining radio resources to be used by underlying pico cell(s) without interference from the macro cell. This kind of resource sharing can change over time to accommodate different traffic demands and traffic situations across the network layers. In contrast to fixed use of different carrier frequencies, ICIC resource sharing can be more or less dynamic, depending on the implementation of the interface between the cells, or network nodes.

In an LTE network, for example, eNBs can communicate with each other via an X2 interface, and so an eNB can readily inform other eNBs that it will reduce its transmit power on certain resources. Time synchronization of the eNBs is required to ensure that ICIC works efficiently, and this is particularly important for time-domain-based ICIC schemes, in which radio resources are shared in time on the same carrier.

LTE uses orthogonal frequency division multiplex (OFDM) in the downlink (DL) from an eNB to user equipments (UEs), or terminals, in its cell, and discrete Fourier transform (DFT)-spread OFDM in the uplink (UL) from a UE to an eNB. LTE communication channels are described in 3GPP Technical Specification (TS) 36.211 V9.1.0, Physical Channels and Modulation (Release 9) (December 2009) and other specifications. For example, control information exchanged by eNBs and UEs is conveyed by physical uplink control channels (PUCCHs) and by physical downlink control channels (PDCCHs).

FIG. 2 depicts the basic LTE DL physical resource as a time-frequency grid of resource elements (REs), in which each RE spans one OFDM subcarrier (frequency domain) for one OFDM symbol (time domain). The subcarriers, or tones, are typically spaced apart by fifteen kilohertz (kHz). In an Evolved Multicast Broadcast Multimedia Services (MBMS) Single Frequency Network (MBSFN), the subcarriers are spaced apart by either 15 kHz or 7.5 kHz. A data stream to be transmitted is portioned among a number of the subcarriers that are transmitted in parallel. Different groups of subcarriers can be used at different times for different purposes and different users.

FIG. 3 generally depicts the organization over time of an LTE DL OFDM carrier in the frequency division duplex (FDD) mode of LTE according to 3GPP TS 36.211. The DL OFDM carrier comprises a plurality of subcarriers within its bandwidth as depicted in FIG. 2, and is organized into successive frames of 10 milliseconds (ms) duration. Each frame is divided into ten successive subframes, and each subframe is divided into two successive time slots of 0.5 ms. Each slot typically includes either six or seven OFDM symbols, depending on whether the symbols include long (extended) or short (normal) cyclic prefixes.

FIG. 4 also generally depicts the LTE DL physical resource in terms of physical resource blocks (PRBs, or RBs), with each RB corresponding to one slot in the time domain and twelve 15-kHz subcarriers in the frequency domain. Resource blocks are consecutively numbered within the bandwidth of an OFDM carrier, starting with 0 at one end of the system bandwidth. Two consecutive (in time) resource blocks represent a resource block pair and correspond to two time slots (one subframe, or 0.5 ms).

Transmissions in LTE are dynamically scheduled in each subframe, and scheduling operates on the time interval of a subframe. An eNB transmits assignments/grants to certain UEs via a PDCCH, which is carried by the first 1, 2, 3, or 4 OFDM symbol(s) in each subframe and spans over the whole system bandwidth. A UE that has decoded the control information carried by a PDCCH knows which resource elements in the subframe contain data aimed for the UE. In the example depicted by FIG. 4, the PDCCHs occupy just the first symbol of three symbols in a control region of the first RB. In this particular case, therefore, the second and third symbols in the control region can be used for data.

The length of the control region, which can vary from subframe to subframe, is signaled to the UEs through a physical control format indicator channel (PCFICH), which is transmitted within the control region at locations known by the UEs. After a UE has decoded the PCFICH, it knows the size of the control region and in which OFDM symbol data transmission starts. Also transmitted in the control region is a physical hybrid automatic repeat request (ARQ) indicator channel (PHICH), which carries acknowledged/not-acknowledged (ACK/NACK) responses by an eNB to granted uplink transmission by a UE that inform the UE about whether its uplink data transmission in a previous subframe was successfully decoded by the eNB or not.

Coherent demodulation of received data requires estimation of the radio channel, which is facilitated by transmitting reference symbols (RS), i.e., symbols known by the receiver. Acquisition of channel state information (CSI) at the transmitter or the receiver is important to proper implementation of multi-antenna techniques. In LTE, an eNB transmits cell-specific reference symbols (CRS) in all DL subframes on known subcarriers in the OFDM frequency-vs.-time grid. CRS are described in, for example, Clauses 6.10 and 6.11 of 3GPP TS 36.211. A UE uses its received versions of the CRS to estimate characteristics, such as the impulse response, of its DL channel. The UE can then use the estimated channel matrix (CSI) for coherent demodulation of the received DL signal, for channel quality measurements to support link adaptation, and for other purposes. LTE also supports UE-specific reference symbols for assisting channel estimation at eNBs.

Before an LTE UE can communicate with the LTE network, i.e., with an eNB, the UE has to find and synchronize itself to a cell (i.e., an eNB) in the network, to receive and decode the information needed to communicate with and operate properly within the cell, and to access the cell by a so-called random-access procedure. The first of these steps, finding a cell and syncing to it, is commonly called cell search.

Cell search is carried out when a UE powers up or initially accesses a network, and is also performed in support of UE mobility. Thus, even after a UE has found and acquired a cell, which can be called its serving cell, the UE continually searches for, synchronizes to, and estimates the reception quality of signals from cells neighboring its serving cell. The reception qualities of the neighbor cells, in relation to the reception quality of the serving cell, are evaluated in order to determine whether a handover (for a UE in Connected mode) or a cell re-selection (for a UE in Idle mode) should be carried out. For a UE in Connected mode, the handover decision is taken by the network based on reports of DL signal measurements provided by the UE. Examples of such measurements are reference signal received power (RSRP) and reference signal received quality (RSRQ).

Depending on how the measurements, possibly complemented by a configurable offset, are used, the UE can be connected to the eNB having the strongest received power, or to an eNB having the best path gain (lowest path loss), or a combination. Those do not usually result in the same selected cell, as the output powers of eNBs of different types can be different. This is sometimes called link imbalance. For example, the output power of a pico cell or a relay node can be on the order of more than 16 dB less than the output power of an overlying macro cell. Consequently, even for a UE that is close to a pico cell, the downlink signal strength from an overlying macro cell can be larger than that of the pico cell. From a downlink perspective, it is better to select a cell based on downlink received power, but from an uplink perspective, it is better to select a cell based on the path loss.

FIG. 5 depicts that cell selection dilemma for the macro cell 120 and underlying pico cell 114, showing an UL cell border that is closer to the macro cell 120 than is the DL cell border. The UL border is the locus of points yielding the same UL signal level at the cells 114, 120, and the DL border is the locus of points with the same DL signal level from the cells 114, 120. The UL signal levels are related to the path losses between a UE and the respective cells, and the inverse path loss levels (path gains) are indicated by dashed lines. The received DL signal levels are indicated by solid lines. The UL border is closer to the macro cell 120 than is the DL border due to the higher path loss to the macro cell. A UE disposed between the UL and DL borders could select the macro cell 120 based on its higher received power, or it could select the pico cell 114 based on its higher path gain (lower path loss).

In the scenario depicted by FIG. 5, it might be better from a network perspective for a UE between the UL and DL borders to connect to the pico cell 114 even when the UE's received signal level of the macro cell downlink is 10-12 dB (or even more) stronger than the UE's received signal level of the pico cell downlink. Such operation requires ICIC across the network layers when UEs operate within the region between the UL border and the DL border (i.e., "the link imbalance zone").

FIG. 6 illustrates a simple-minded way to provide ICIC across network layers. In FIG. 6, successions of DL subframes transmitted by a macro 120 interfere with subframes transmitted by a pico cell 114, but the macro cell alternates typical subframes 610 and subframes 620 in which it does not transmit PDCCHs (indicated by the areas at the beginnings of the subframes) or data. The pico cell 114 is made aware of the regular locations (times) of the "blank" subframes 620, which cause low interference toward the pico cell. The pico cell 114 can schedule communications with its UEs operating in the link imbalance zone in subframes aligned with the macro cell's blank subframes 620.

The arrangement of regularly occurring "blank" subframes depicted in FIG. 6 is not practical for implementing ICIC and reducing interference across layers of a heterogeneous network for several reasons. Cell search is more difficult because a UE might make its downlink measurements in a cell's "blank" subframes, the positions of which the UE typically cannot know until it has synchronized itself to the cell. In addition, LTE legacy UEs, such as UEs complying with older versions of the 3GPP specifications, need CRS to be transmitted in all subframes, even the regularly occurring "blank" subframes 620, and so the subframes 620 cannot be completely blank. It is also difficult to avoid transmitting other DL channels in the "blank" subframes. For example, to avoid PHICH transmissions in the blank" subframes 620, it would be necessary to preserve the HARQ timing specified by 3GPP LTE Release 8, in which a normal FDD HARQ subframe always occurs 8 ms after the subframe carrying a UE's uplink grant. Simply not transmitting the PHICH is not a practical option, as that would likely result in uplink re-transmissions.

Moreover, the 3GPP LTE Release 8 and Release 9 specifications do not specify a set of subframes a UE is to use for DL signal measurements (that is left to the UE manufacturers for implementation), and those specifications do not support signaling to legacy UEs for requesting measurements in only certain subframes. Thus, in a network of time-synchronized macro cells, legacy terminals periodically making DL measurements can find themselves always performing their measurements in "blank" subframes 620, with the result that the measurements do not accurately reflect the interference situation in (possibly non-blank) subframes where the legacy terminals are scheduled. This can result in increased numbers of re-transmissions and degraded system performance, including dropped calls due to terminals' not being handed over to other cells at the appropriate times.

SUMMARY

Hence there is a need for methods and apparatus that implement ICIC in a network and that minimize problems with cell search and other network operations and that accommodate legacy terminals.

In accordance with this invention, a varying pattern is configured for resources assigned to have a reduced transmission activity in heterogeneous network deployments to mitigate inter-cell interference. In one embodiment, the network configures the occasions of the resource assigned to have a reduced transmission activity on a regular basis and from time to time introduces a time shift of the resource assigned to have a reduced transmission activity. These time shifts can be introduced every X radio frames, where X is a predetermined or configurable parameter. In another embodiment, a pseudo-random function is evaluated to indicate whether a certain set of resources should have a reduced transmission activity or not.

In accordance with aspects of this invention, there is provided a method of controlling transmission resources in a transmitting node for a communication network, in which transmission resources are organized in a temporal succession on a carrier. The method includes selecting transmission resources for reduced transmission activity according to a pattern such that selected transmission resources occur at varying predictable times in the temporal succession. The transmission activity of a selected transmission resource is reduced with respect to the transmission activity of a respective transmission resource not selected.

Also in accordance with aspects of this invention, there is provided an arrangement in a transmitting node for controlling transmission resources of the transmitting node for a communication network, in which transmission resources are organized in a temporal succession on a carrier. The arrangement includes an electronic processor circuit configured for selecting transmission resources for reduced transmission activity according to a pattern such that selected transmission resources occur at varying predictable times in the temporal succession. The transmission activity of a selected transmission resource is reduced with respect to the transmission activity of a respective transmission resource not selected.

Also in accordance with aspects of this invention, there is provided a method of reducing measurement interference in a receiving node for a communication network, in which received transmission resources are organized in a temporal succession on a carrier. The method includes determining a cell activity pattern that locates received transmission resources having reduced transmission activity that occur at varying predictable times in the temporal succession on the carrier; deciding whether to perform a measurement on a received transmission resource according to the cell activity pattern; and performing the measurement on the received transmission resource according to the decision.

Also in accordance with aspects of this invention, there is provided an arrangement for reducing measurement interference in a receiving node for a communication network, in which received transmission resources are organized in a temporal succession on a carrier. The arrangement includes an electronic processor circuit configured for determining a cell activity pattern that locates received transmission resources having reduced transmission activity that occur at varying predictable times in the temporal succession on the carrier, for deciding whether to perform a measurement on a received transmission resource according to the cell activity pattern, and for causing the receiving node to perform the measurement according to the decision.

BRIEF DESCRIPTION OF THE DRAWINGS

The several features, objects, and advantages of this invention will become apparent by reading this description in conjunction with the drawings, in which.

DETAILED DESCRIPTION

Figure 1:
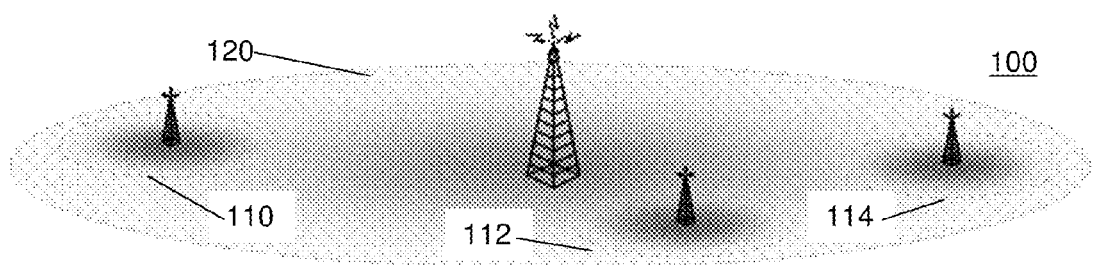
FIG. 1 depicts an example of a heterogeneous communication network.
Figure 2:
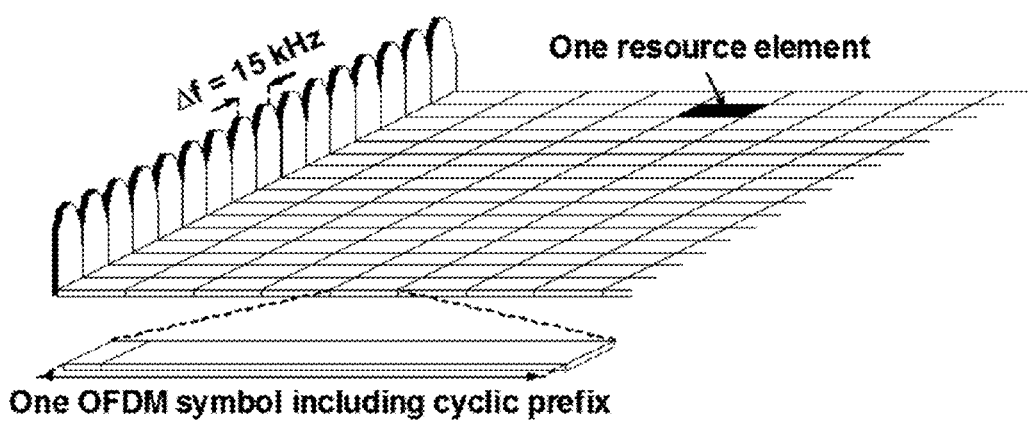
FIG. 2 depicts a downlink physical resource of a Long Term Evolution communication network.
Figure 3:
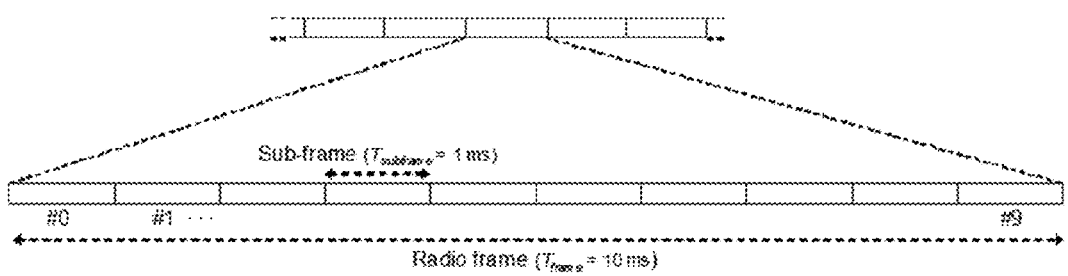
FIG. 3 depicts an organization of downlink in a frequency division duplex mode of a Long Term Evolution network.
Figure 4:
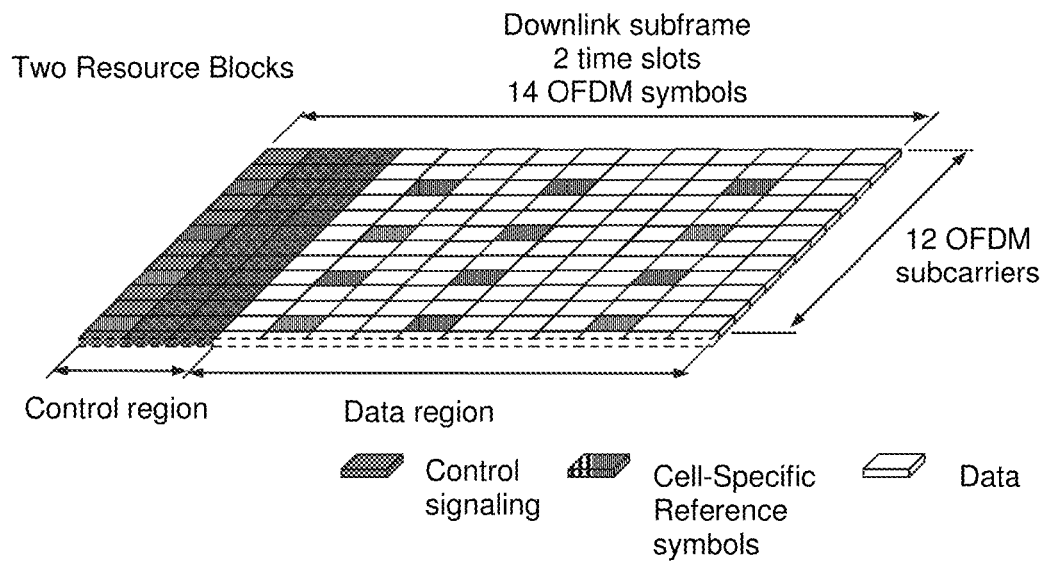
FIG. 4 depicts the downlink physical resource of a Long Term Evolution communication network as physical resource blocks.
Figure 5:
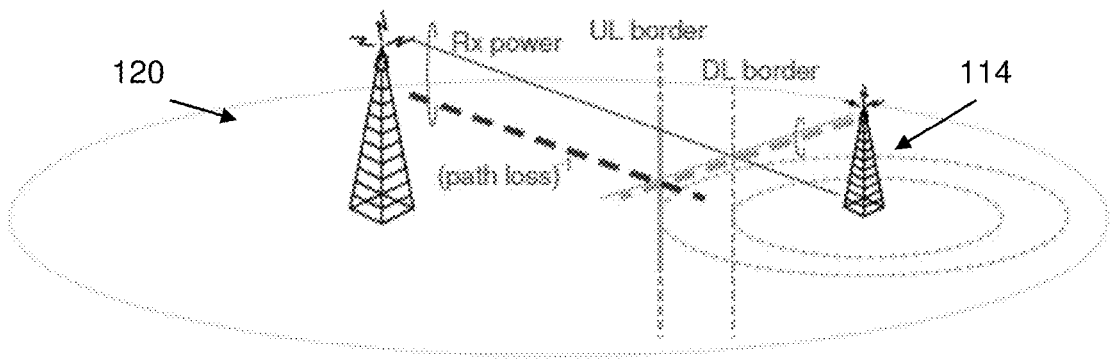
FIG. 5 illustrates cell selection signal levels for a macro cell and an underlying pico cell.

The inventors have recognized that ICIC across network layers can be implemented by configuring an overlying macro cell to transmit one or more DL frames, sub-frames, resource blocks, resource elements, etc. having time-varying reduced transmission activity, and a macro cell transmits such transmission resources having reduced transmission activity at times according to a selected cell activity pattern that is time-varying.

It will be understood that this application focuses on an LTE communication network, and that the principles of this invention can be applied in other communication networks, including WCDMA and similar networks, and in particular in other communication networks that use a multiple-carrier radio access technology. Thus, references to eNBs will be understood as references to radio base stations (RBSs). In addition, calling a node a transmitting node does not preclude the node from receiving, and vice versa. For example, eNBs, RBSs, and UEs can be transmitting nodes and receiving nodes, and relay nodes and femto base stations can be eNBs or RBSs equipped with radio receivers, and UEs can be configured for mobile relaying.

It will be understood that femto base stations are devices that have limited range, e.g., a shop, a house, etc. A femto RBS or femto eNB provides normal WCDMA or LTE coverage for UEs in a so-called femto cell, and can be connected to a mobile operator's network via Internet-Protocol-based communication. For example, fixed broadband access (e.g., such as a Digital Subscriber Line or Cable connection) or high-speed wireless communication can be used to connect the femto node to the larger communication network.

In this application, a DL resource block (RB) or sub-frame has reduced transmission activity if at least one of its REs is transmitted with lower power than is typical for that RB or sub-frame. A RB with a reduced transmission activity is a set of radio resources consecutive in time and frequency over which certain rules on reducing the transmission activity apply, e.g., not transmitting a control channel that is typically transmitted in that RB and/or transmitting data at a lower power in that RB. Another example of a RB with a reduced transmission activity is a blank subframe. The reduced transmission activity can also apply to parts of the RB or parts of the sub-frame, e.g., certain symbols and/or certain subcarriers. In this and other examples in this application, "typical" can be as required by applicable specifications for the communication network.

For example, a DL RB or sub-frame has reduced transmission activity if it does not include a control channel that it would typically include. In this example, the power of the REs in the control region of the RB that would typically carry the control channel is zero or substantially zero, which is any power level lower than the typical power level of those REs, with other REs in the control region and/or data region carrying data or not, as desired.

For another example, a DL RB has reduced transmission activity if it includes data-region REs transmitted at lower power than normal. In this example, the power of the REs in the data region of the RB that would typically carry data is zero or substantially zero, which is any power level lower than the typical power level of those REs, with other REs in the control region carrying control-channel data or not, as desired.

For another example, a subframe has reduced transmission activity if it is blank or almost blank, which is to say, all or almost all of the subframe's REs have reduced or zero transmission power levels. An MBSFN subframe is an example of a subframe having all or almost all REs with reduced or zero transmission power levels. In an MBSFN subframe, only every third RE (for the case of two antenna ports) in the first OFDM symbol of the subframe is used for CRS transmissions and so has non-zero power, and all other REs in the subframe have zero power. The first ODFM symbol of an MBSFN subframe has some REs with non-zero power for the sake of backward compatibility. Thus, almost all REs in the control region of an MBSFN subframe have zero transmission power levels, and all REs in the data region of the MBSFN subframe have zero transmission power levels. For some normal subframes and two antenna ports, sixteen REs out of 168 REs can have non-zero power, and such subframes are also examples of subframes having all or almost all REs with reduced or zero transmission power levels.

For another example, a subframe has reduced transmission activity if it lacks the usual unicast transmissions, i.e., transmissions dedicated to a certain UE have reduced or zero transmission power levels. It will be understood that suppressing certain transmissions, e.g., (1) not transmitting certain channels, or certain control signals, data, or reference symbols or bits, or (2) using a power level for transmitting certain channels, or certain control signals, data, or reference symbols or bits that is identifiably lower than the typical power level for such transmission, can be seen as transmitting blank or almost blank subframes. Some examples of such channels are data channels, e.g., packet data shared channels (PDSCHs), and some physical signals. Due to the requirements or specified behavior of earlier-release UEs, some signals and channels, e.g., CRS, synchronization signals, and broadcast system information, have to be transmitted and cannot be avoided even in low-interference, reduced-transmission-activity subframes.

It will be understood that, in general, reduced transmission activity can alternatively apply to one or more parts of a subframe or part of a resource block, e.g., certain symbols and/or certain subcarriers. This can be advantageous for several reasons, such as enabling interference coordination in the control regions of frames/subframes separately from interference coordination in the data regions (which may be lightly loaded and so may not require coordination), or enabling interference coordination for signals or channels for which RE mapping is pre-determined.

It will also be understood that an LTE subframe contains many RBs, and of course all RBs do not need to have reduced transmission activity for the corresponding subframe to have reduced transmission activity. Furthermore, RBs are transmitted time-consecutive in pairs, so there can be an even number of RBs that have reduced transmission activity in a subframe in the time domain, but considered in the frequency domain, the granularity is one RB. In an LTE communication network, data is conveyed in at least two RBs, and control information is interleaved over at least six RBs. Moreover, the reduced activity can be applied either to all transmissions by a cell or to certain signals or channels (and therefore certain REs) transmitted by the cell or to some reference signals transmitted by the cell (and the power for other reference signals can be determined with respect the reduced-activity reference signals). It will also be understood that the power level of an RB or subframe having reduced transmission activity need not be only zero or substantially zero power, but can be a power level less than a typical or reference power level for such an RB or subframe, e.g., 10-20 dB less than the typical power level.

A cell activity pattern is a set of rules that specify time-varying yet predictable occurrences of REs, RBs, or subframes that have reduced transmission activity before the occurrences are randomized or otherwise varied. Cell activity patterns can generally be characterized by pattern length, periodicity (i.e., repetition period), cyclic shift, bandwidth (which can be less than a carrier or system bandwidth), carrier or carrier indicator, activation point (i.e., in which subframe the pattern starts to apply), and re-activation periodicity.

Figure 7:
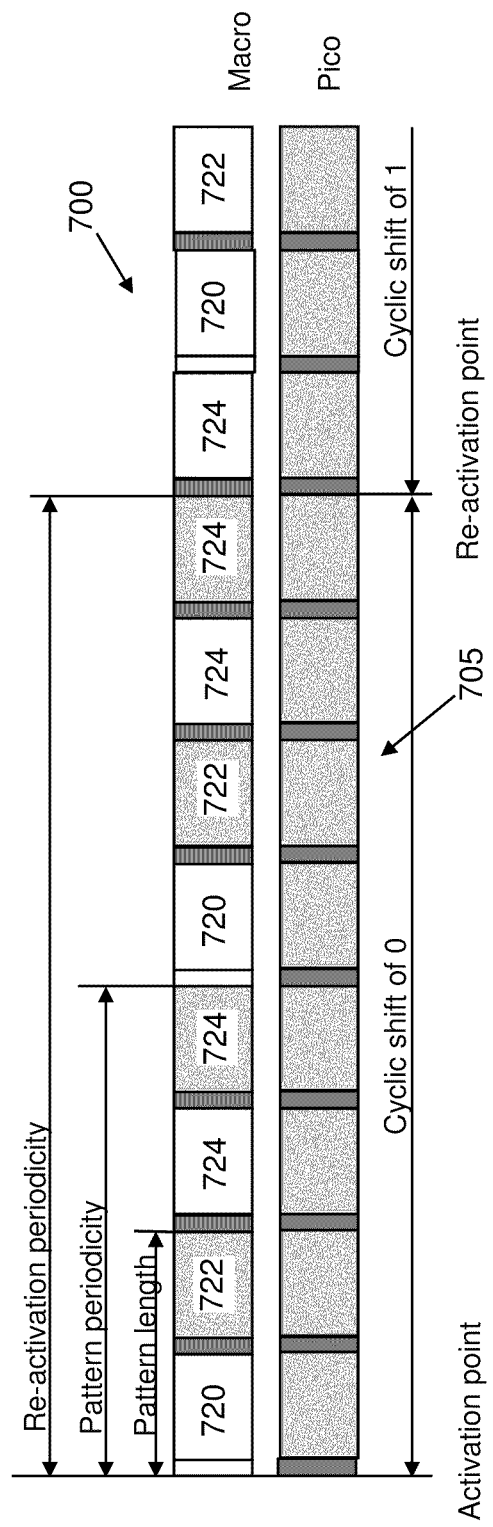
FIG. 7 illustrates characteristics of cell activity patterns for inter-cell interference coordination across network layers in accordance with this invention.

FIG. 7 illustrates the characteristics of a cell activity pattern, showing a succession of subframes 700 transmitted by a macro cell, and for comparison, a succession of subframes 705 transmitted by an underlying pico cell. FIG. 7 shows an example pattern of two subframes 720, 722, with the subframe 720 including an RB having reduced transmission activity and the conventional subframe 722 having normal transmission activity. Thus, the length of the example pattern is two subframes (four RBs), only one of which (subframe 720) includes an RB having reduced transmission activity. As depicted in FIG. 7, two conventional subframes 724 occur after the example pattern and then the pattern repeats, and so the example pattern has a periodicity of four subframes. It should be understood, however, that the pattern depicted in FIG. 7 is simply an example, and a suitable cell activity pattern need not always have just one RB having reduced transmission activity.

As depicted in FIG. 7, an activation point of the example cell activity pattern is the left-most (earliest) subframe in the succession 700, and the pattern can be said to have a cyclic shift of zero subframes as the RBs having reduced transmission activity occurs in the first subframe of four subframes of the period of the pattern. The example pattern is re-activated with a new cyclic shift when the pattern has occurred twice, and as depicted in FIG. 7, the cyclic shift is one subframe. The re-activation periodicity can differ from the pattern periodicity, and for example, the re-activation periodicity can be a multiple of the pattern periodicity.

Figure 6:
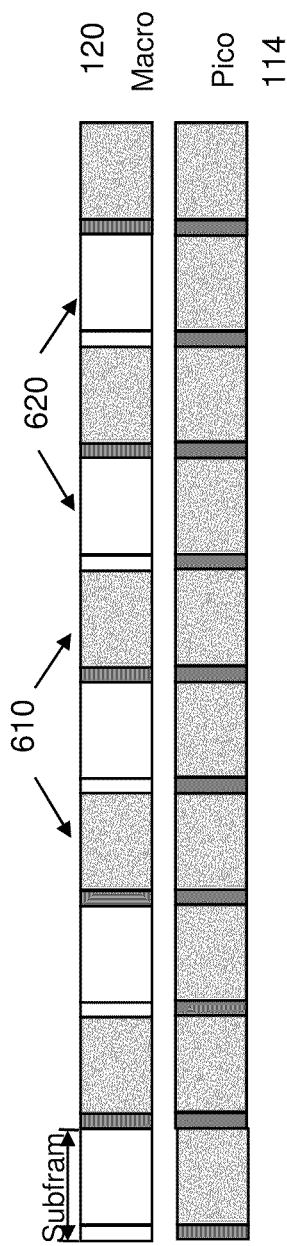
FIG. 6 illustrates a way of inter-cell interference coordination across layers of a heterogeneous communication network.

A suitable cell activity pattern is any pattern that produces time-varying predictable occurrences of reduced-activity REs, RBs, and/or subframes, in contrast to time-fixed, or repeating, occurrences, such as that depicted in FIG. 6, and also of course in contrast to unpredictable occurrences, such as occurrences due to noise, channel fading, etc. Accordingly, it will be understood that the parameters listed above that characterize cell activity patterns are not all mutually independent. For example, a pattern having a pattern length of one subframe and a pattern periodicity of one subframe is not a suitable cell activity pattern because it does not produce time-varying occurrences of reduced-activity RBs. It will be appreciated that, in general, suitable cell activity patterns have at least either a pattern length or a pattern periodicity that is greater than one subframe. (For comparison, it may be noted that the unsuitable pattern depicted by FIG. 6 has a pattern length of two subframes and a pattern periodicity of zero subframes.) Thus, it can be understood that in general a suitable cell activity pattern yields temporal distances between pairs of successive occurrences of reduced-activity transmission resources that are not the same for all pairs across a stream of subframes or other temporal succession on a carrier.

A cell activity pattern can be network-specific, eNB-specific, carrier-specific, or any combination of them. A network-specific cell activity pattern can correspond to the mobile country code (MCC) and/or mobile network code (MNC) that conventionally identify wireless telephone networks, and an eNB-specific cell activity pattern can correspond to the cell identification (ID) that is broadcast by eNBs and other radio access nodes. For example in a network of asynchronous eNBs, even if all eNBs use a nominally the same cell activity pattern (i.e., a network-specific pattern), the effective patterns seen by UEs in the different cells will be different (i.e., eNB-specific patterns). For example, the activation point can be effectively different in each cell. Thus, it will be understood that a cell activity pattern can correspond to, or be based on, an indicator of at least one of the communication network, the transmitting node, and the carrier, including being based on a class of transmitting node and related to its coverage range, in addition to applying to certain channels and physical signals as described above.

In an embodiment described in more detail below, the eNB in the macro cell includes a timer or a counter configured to determine activation and re-activation points and cyclic shifts of a cell activity pattern. Thus, disadvantages of a fixed pattern of RBs having reduced transmission activity such as that depicted in FIG. 6 are avoided in accordance with this invention. Moreover, the timer or counter can also be used in selecting new cell activity patterns and randomizing RBs having reduced transmission activity in selected patterns. Such a counter can be configured to count either subframes or frames.

In general, the timer or counter can be configured to start at an activation point and then reset and re-start after a certain time elapses or a certain frame or subframe count occurs. Upon each start or re-start of the timer or counter, the cell activity pattern cyclically shifts by an increment value that can be either predetermined, or determined by the eNB, or configured by signaling, e.g., from an operation and maintenance (O&M) system of the network. Some UEs can be aware of the cell activity pattern in use, e.g., because the pattern is predetermined or signaled. Such UEs can then be aware that not all "blank" subframes are actually blank, and can use this information, e.g., when doing receive signal measurements. In the example depicted in FIG. 7, the pattern cyclically shifts (in this example, increases) by one subframe at the re-activation point, which would be determined by the timer's determining the lapse of a time corresponding to eight subframes or the counter's counting the occurrence of eight subframes, i.e., the re-activation periodicity of the cell activity pattern in use.

In general, the cyclic shift at each re-activation time can be given by the following:

$$\Delta_1 = \mathrm{mod}((\Delta_0 + \Delta), L)$$

in which $\Delta_1$ is the cyclic shift at a re-activation time, $\Delta_0$ is the cyclic shift at the preceding re-activation time, $\Delta$ is the value of the shift increment value, L is the pattern length, and mod(.,.) is the modulo function. For a pattern such as that depicted in FIG. 7, the next position of the pattern is $\Delta_0 + T + \Delta_1$ (because the position increases at every re-activation time), where T is the re-activation periodicity. For the example in FIG. 7, the shift increment value $\Delta=1$, the pattern length L=2, and the re-activation periodicity T=8. For example, the increment value A can be a pseudo-random number generated periodically or from time to time by the eNB. It will be appreciated that the cyclic shift changes in a deterministic way, i.e., it increases in the example in FIG. 7 by a fixed amount $\Delta$ each time it is called, and so the cell activity pattern varies with time automatically.

The period of the timer or count of the counter can be pre-defined (and so known to the eNBs and the UEs) or the timer period or counter count can be determined by a node of a communication network and signaled, or indicated, to other nodes of the communication network. As one example of indicating to another node, the timer period or counter count can be signaled by an eNB to a UE over the radio interface, e.g., via one or more RRC-protocol messages or information elements sent by the eNB to the UE. RRC messaging in an LTE network is specified in 3GPP TS 36.331 V8.10.0 (June 2010), Evolved Universal Terrestrial Radio Access (E-UTRA); Radio Resource Control (RRC); Protocol specification (Release 8), among other specifications. For another example of indicating to another node, the timer period or counter count can be signaled by an eNB to other nodes of the communication network, e.g., via the X2 interface to other eNBs, relay nodes, etc. For another example of indicating to another node, the timer period or counter count can be signaled to a central network-controlling node and/or to a network O&M system. From those examples, it can be seen that the cell activity pattern can be known to both the UE and the rest of the network (e.g., eNBs, relays, etc.) and so signaling overhead can be avoided or reduced and UE behavior can be enhanced, for example, in heterogeneous deployment scenarios and resource-restricted UE measurement scenarios.

Suitable cell activity patterns as described above vary over time the position or positions of an RB or RBs having reduced transmission activity. It will be appreciated that for an OFDM carrier, such variation over time, which can be pseudo-random, can also be a variation over subcarrier (that is to say, a variation over radio frequency) as the pattern can affect REs, RBs, sets of OFDM symbols, etc. as described above. Thus, variation over time should be understood to include variation over radio frequency in this application. A pattern can be specific for a carrier radio frequency (where "frequency" is understood in a general sense, e.g., a radio frequency band), or a pattern can be the same for at least some radio frequencies. A pattern can also be configured as a function of carrier radio frequency, e.g., more sparse transmissions can be associated with lower radio frequencies because such frequencies typically have better propagation conditions and thus larger coverage. Patterns can be configured differently in different cells, and can change in different ways in different cells. It will be noted that one eNB can be configured to handle more than one cell.

Besides simply using a cell activity pattern for transmission of RBs having reduced transmission activity, a macro cell advantageously pseudo-randomizes the times of such RBs. In one embodiment, the macro cell decides whether an RB that a pattern calls for having reduced transmission activity is actually transmitted with reduced transmission activity based on an evaluation of a pseudo-randomization function. Thus, the three subframes 720 depicted in FIG. 7 may not all include RBs having reduced transmission activity. An example of a suitable pseudo-randomization function is described below, but it will be understood that the pseudo-randomization can be implemented in many equivalent ways.

A suitable time-varying pseudo-randomization function $f(n_{frame}, n_{subframe})$ is defined as follows:

$$f(n_{frame}, n_{subframe}) = \sum_{i=0}^{N-1} w_i c(i + \lfloor k_1 n_{frame} + k_2 n_{subframe} \rfloor)$$

in which $n_{frame}$ is a frame number, $n_{subframe}$ is a subframe number, i is an index, N is a parameter, $w_i$ are weight values, $c(i+\lfloor k_1 n_{frame}+k_2 n_{subframe} \rfloor)$ is a pseudo-random sequence as defined in section 7.2 of 3GPP TS 36.211, $k_1$ and $k_2$ are constants, and $\lfloor . \rfloor$ denotes the largest integer not greater than x. According to 3GPP TS 36.211, the pseudo-random sequence $c(i+\lfloor k_1 n_{frame}+k_2 n_{subframe} \rfloor)$ is defined by a length-31 Gold sequence. Letting $c(i+\lfloor_1 n_{frame}+k_2 n_{subframe} \rfloor)=c(n)$ for convenience, the output sequence c(n) is defined by:

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

where $N_C$=1600 and the first m-sequence is initialized with $x_1(0)=1$, $x_1(n)=0$, n=1, 2, . . . , 30. The initialization of the second m-sequence is denoted by:

$$c_{init} = \sum_{j=0}^{30} x_2(j) \cdot 2^j$$

with the value depending on the application of the sequence. A generator of the pseudo-random sequence c(n) can for example be initialized with the physical cell identity (PCI) and any fixed numeric value. An example of a suitable set of values of the parameters is N=9, $w_i=2^i$, $k_1$=10, and $k_2$=1, although it will be appreciated that other sets of values can be suitable.

It will be appreciated that the above-described set of parameters is a convenient way to randomize the LTE pseudo-random sequence, which can sometimes be less than adequately random, and that many equivalent ways to randomize that sequence can be used. For example, the weight values $w_i=2^i$ are easy to compute in binary, the parameter $k_1$=10 is convenient as there are 10 subframes in each frame in an LTE system, and $k_2$=1 is convenient as it increases c(i) by one for each successive subframe in a frame.

As described above, a macro cell decides whether a RB that a cell activity pattern calls for having reduced transmission activity is actually transmitted with reduced transmission activity based on evaluating the pseudo-randomization function $f(n_{frame}, n_{subframe})$ for the frame and subframe numbers called for by the pattern. For example, if $f(n_{frame}, n_{subframe})$ <T, where T is a threshold value, then the macro cell transmits the RB with normal transmission activity, and if $f(n_{frame}, n_{subframe})$ T, the assigned resources have reduced transmission activity. The threshold value T thus corresponds to a probability that a resource assigned to have reduced transmission activity actually is given normal transmission activity.

Another, simpler, example of a pseudo-randomization function that a macro cell can use to decide whether to transmit resources with reduced transmission activity or normal transmission activity is described below.

Let the time-varying pseudo-randomization function Y(k) be defined as follows:

$$Y(k)=\bmod(AY(k-1),D)$$

where k is a discrete time index, A and D are constants, and mod(.,.) is the modulo function, with the initial value Y(-1) ≠0. For example, the index k can correspond to the subframe number, the initial value Y(-1) can be the PCI or another known value, A can be 39827, and D can be 65537. It will be understood that substantially any other constants A, D can be used.

A macro cell can decide whether an RB that a cell activity pattern calls for having reduced transmission activity is actually transmitted with reduced transmission activity based on evaluating the pseudo-randomization function Y(k) for subframe numbers k called for by the pattern. For example, if Y(k)<T, where T is a threshold value, then the macro cell transmits the RB with normal transmission activity, and if Y(k)≥T, the assigned resources have reduced transmission activity. The threshold value T thus again corresponds to a probability that a resource assigned to have reduced transmission activity actually is given normal transmission activity.

Parameters, such as N, $k_1$, $k_2$, A, and D above, used in a pseudo-randomization function to determine if resources assigned to have reduced transmission activity should have a reduced transmission activity or should have normal transmission activity can be pre-defined (i.e., already known to the eNBs and UEs) or determined by a network node and indicated to another node, e.g., by signaling to a UE over the radio interface via messaging according to the RRC protocol or another suitable protocol, by signaling to other nodes (e.g., via the X2 interface to other types of base stations), by signaling to a network-controlling node, or by signaling to an O&M system. As described above, the cell activity pattern can be known to both the UEs and the network (e.g., eNBs, relays, etc.), reducing signaling overhead and enhancing UE behaviors, for example, in heterogeneous deployment scenarios and resource-restricted UE measurement scenarios.

Embodiments of this invention enjoy a number of advantages over current networks and approaches to ICIC. For example, legacy terminals can report more accurate reference signal received power and reference signal received quality measurements when resources having reduced transmission activity are in use, enabling more consistent performance of all legacy terminals.

Figure 8A:
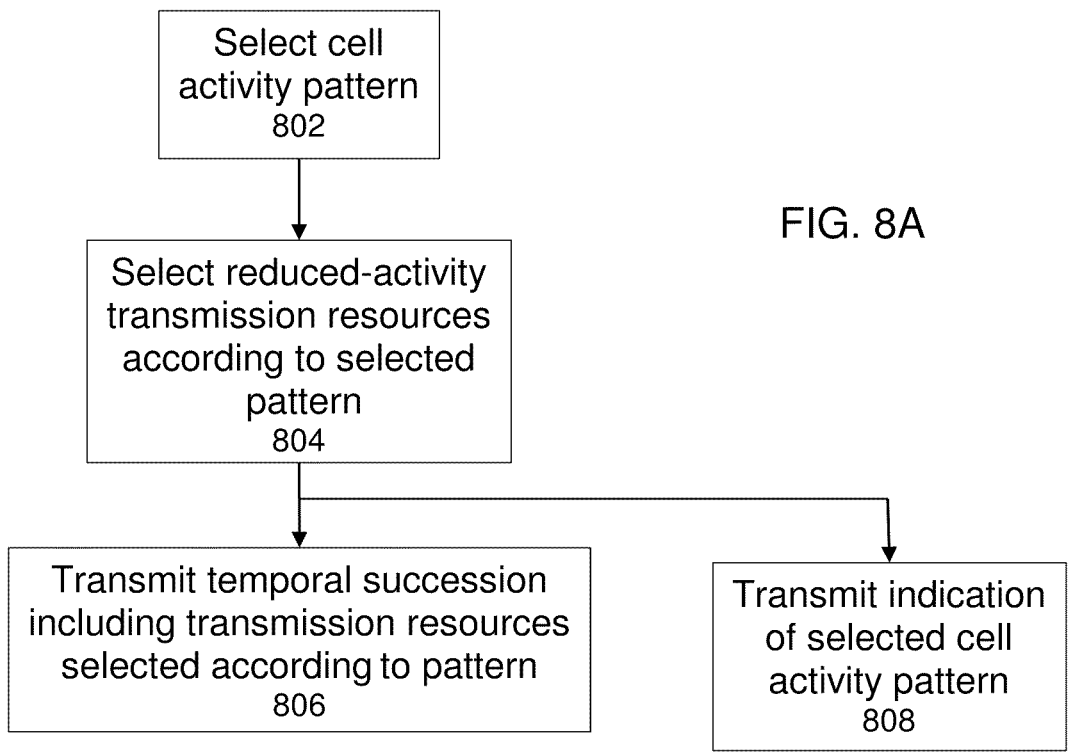
FIG. 8A is a flow chart of a method of controlling transmission resources in a transmitting node.

FIG. 8A is a flow chart of a method of controlling transmission resources that can be carried out in an eNB or other suitable transmitting node for a communication network. As described above, the transmission resources can be organized in a temporal succession on a carrier, which can be an OFDM carrier or another type of carrier having a number of subcarriers. The transmission resources can be one or more resource blocks, sets of OFDM symbols, and sets of subcarriers, and the temporal succession can be successive frames or subframes. Accordingly, the transmission resources can have granularity in the time domain, in the frequency domain, or in both domains. It will thus be understood that a carrier need not include a number of subcarriers, but can be a unitary carrier, such as a WCDMA carrier, that embraces a bandwidth in the frequency domain. For such a unitary carrier, granularity of transmission resources in the frequency domain may be avoided since information is typically modulated over the whole bandwidth of a unitary carrier.

In step 802, the eNB or other transmitting node selects a cell activity pattern that identifies at least one transmission resource for reduced transmission activity by determining at least one of a pattern length, periodicity, cyclic shift, bandwidth, carrier, activation point, and re-activation periodicity as described above. For example, the characteristics of the cell activity pattern can be selected by the eNB, or can be signaled to the eNB from another node of the communication network. Instead of explicitly selecting a cell activity pattern, it will be understood that the cell activity pattern can instead be predefined in the eNB, or transmitting node. In any case, the cell activity pattern can be based on at least one of the communication network, the transmitting node, and the carrier. For example, the pattern can correspond to an indicator of at least one of the communication network, the transmitting node, and the carrier.

In step 804, the eNB selects transmission resources for reduced transmission activity according to the pattern such that selected transmission resources having reduced transmission activity occur at varying times in the temporal succession on the carrier. A transmission resource selected for reduced transmission activity can have either a reduced or substantially zero transmission power level, and selected transmission resources can occur at pseudo-random times in the temporal succession. Such pseudo-random times can be determined by evaluating a pseudo-randomization function and comparing a respective function value for each pseudo-random time to a threshold as described above. When the carrier is an OFDM carrier or the like, the selected transmission resources can occur at varying radio frequencies due to the nature of a transmission resource. When the temporal succession includes a succession of subframes, the varying times of the selected transmission resources can occur by changing the pattern according to an elapsed time period or a subframe count.

In step 806, the temporal succession is transmitted by the eNB or other transmitting node, including transmission resources having reduced transmission activity selected according to the cell activity pattern. In step 808, the eNB indicates the pattern to another node of the communication network, such as one or more UEs, eNBs, relay nodes, control nodes, O&M nodes, etc.

Figure 8B:
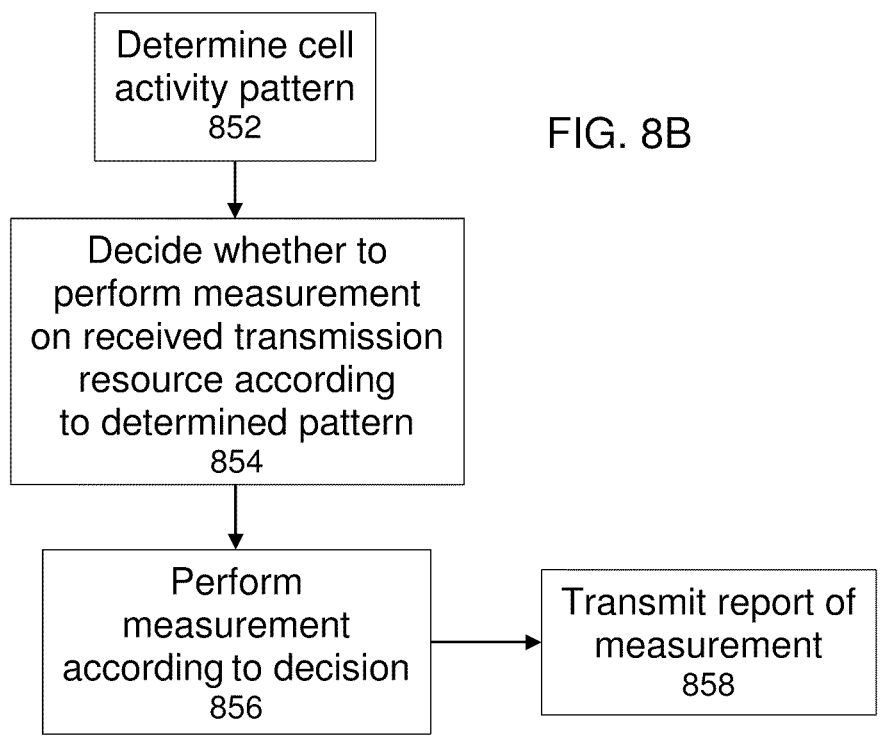
FIG. 8B is a method of reducing measurement interference in a receiving node.

FIG. 8B is a flow chart of a method of reducing measurement interference that can be carried out in a UE or other suitable receiving node for a communication network, in which as described above, received transmission resources are organized in a temporal succession on a carrier, such as an OFDM carrier having a number of OFDM subcarriers. The transmission resources can be one or more resource elements, resource blocks, sets of OFDM symbols, sets of OFDM subcarriers, etc., and the temporal succession can be a succession of frames or subframes.

In step 852, the UE determines a cell activity pattern used by a transmitting node that locates received transmission resources having reduced transmission activity that occur at varying times in the temporal succession on the carrier. The UE can determine the pattern by determining at least one characteristic, such as a pattern length, periodicity, cyclic shift, bandwidth, carrier, activation point, and re-activation periodicity as described above. Pattern characteristics can be predefined, and so be already known to the UE, in which case determining the pattern can include simply retrieving the pattern from a UE memory and identifying the phase of the pattern as transmitted. For another example, the UE can determine the pattern based on a signal received by the UE from another node, such as an eNB. In any case, the cell activity pattern can be network-specific, eNB-specific, carrier-specific, and any combination of them as described above.

In step 854, the UE decides whether to perform at least one measurement on a received transmission resource according to the determined cell activity pattern. The UE can either decide to perform the measurement during a period of reduced transmission activity or the UE can decide to not perform the measurement during a period of reduced transmission activity. The measurement can be RSRP, RSRQ, CSI, or another mobility measurement as described above.

In step 856, the UE performs the measurement according to the decision in step 854, and in step 858, the UE optionally transmits a report of the at least one measurement it has made according to the cell activity pattern.

As described above, transmission resources having reduced transmission activity occur at varying times in the temporal succession on the carrier, and so even a UE that decides to make periodic downlink measurements reduces its measurement interference. More "intelligent" UEs can use the pattern more actively, and decide to make downlink measurements of a cell, such as a pico cell, during the times that an interfering cell, such as an overlying macro cell, is using transmission resources having reduced transmission activity. A transmission resource having reduced transmission activity can have either a reduced or substantially zero transmission power level, and can occur at pseudo-random times in the temporal succession that the UE can locate by evaluating an agreed-on pseudo-randomization function and comparing a respective function value for each pseudo-random time to a threshold as described above. When the carrier is an OFDM carrier or the like, the transmission resources having reduced transmission activity can occur at varying radio frequencies due to the nature of a transmission resource. When the temporal succession includes a succession of subframes, the UE can follow the varying times of the selected transmission resources by changing its determined pattern according to an elapsed time period or a subframe count.

Figure 9A:
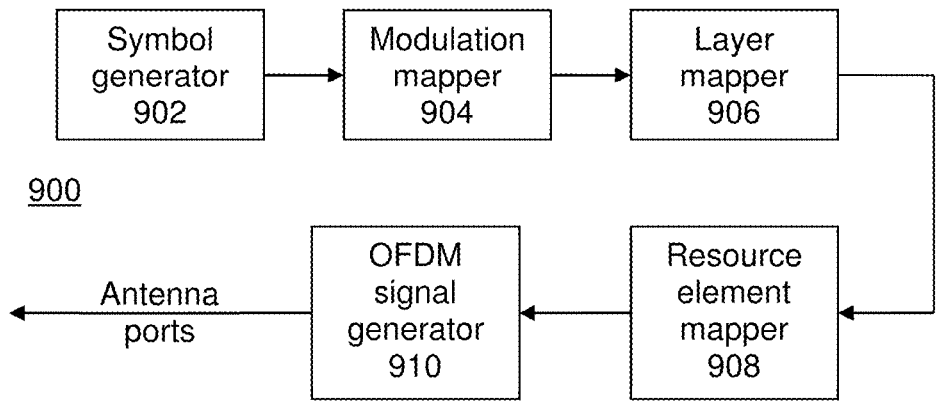
FIG. 9A is a block diagram of a portion of a transmitter for a communication network.

FIG. 9A is a block diagram of an example of a portion of transmitter 900 for an eNB or other transmitting node of a communication system that uses the signals described above. Several parts of such a transmitter are known and described for example in Clauses 6.3 and 6.4 of 3GPP TS 36.211. Reference signals having symbols as described above are produced by a suitable generator 902 and provided to a modulation mapper 904 that produces complex-valued modulation symbols. A layer mapper 906 maps the modulation symbols onto one or more transmission layers, which generally correspond to antenna ports. An RE mapper 908 maps modulation symbols for each antenna port onto respective REs and thus forms successions of RBs, subframes, and frames, and an OFDM signal generator 910 produces one or more complex-valued time-domain OFDM signals for eventual transmission.

It will be appreciated that the functional blocks depicted in FIG. 9A can be combined and re-arranged in a variety of equivalent ways, and that many of the functions can be performed by one or more suitably programmed digital signal processors. Moreover, connections among and information provided or exchanged by the functional blocks depicted in FIG. 9A can be altered in various ways to enable a device to implement the methods described above and other methods involved in the operation of the device in a digital communication system.

Figure 9B:
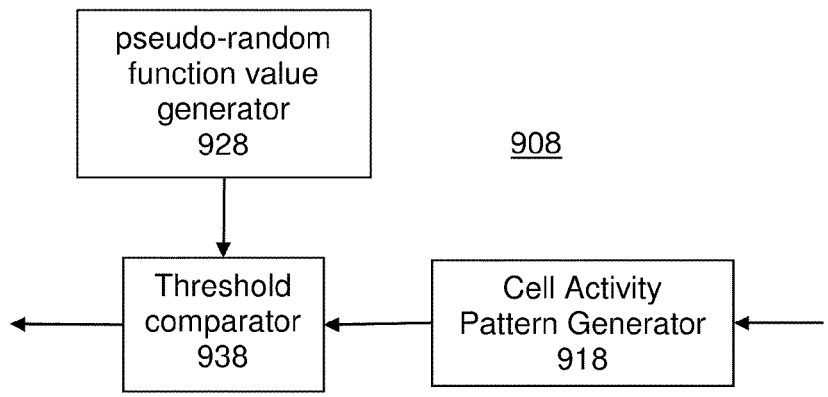
FIG. 9B is a block diagram of an example of a resource element mapper for controlling transmission resources.

FIG. 9B is a more detailed block diagram of an example of an RE mapper 908 in accordance with this invention. As depicted in FIG. 9B, the RE mapper 908 is generally an electronic signal processor that is configured to include a cell activity pattern generator 918, a pseudo-randomization function value generator 928, and a threshold comparator 938.

As described above, the generator 918 can be configured to generate a cell activity pattern that has a pattern length, periodicity, cyclic shift, bandwidth, carrier, activation point, and re-activation periodicity, and that identifies at least one transmission resource, such as an RE, RB, subframe, or frame, for reduced transmission activity. Accordingly, the generator 918 can be configured to include a timer or a counter that determines activation and re-activation points and cyclic shifts of a cell activity pattern that results in varying temporal locations of the transmission resource(s) having reduced transmission activity.

The generator 928 is configured for evaluating a pseudo-randomization function at a transmission position of an identified transmission resource, and the comparator 938 compares the function value to a threshold. As a result of operation of the generator 928 and comparator 938, which can be considered optional, the RE mapper 908 can pseudo-randomly determine whether a transmission resource identified for reduced transmission activity is actually transmitted with reduced transmission activity. Thus, the mapper 908 can select transmission resources for reduced transmission activity such that the selected transmission resources occur at pseudo-random times, or temporal locations.

Figure 10A:
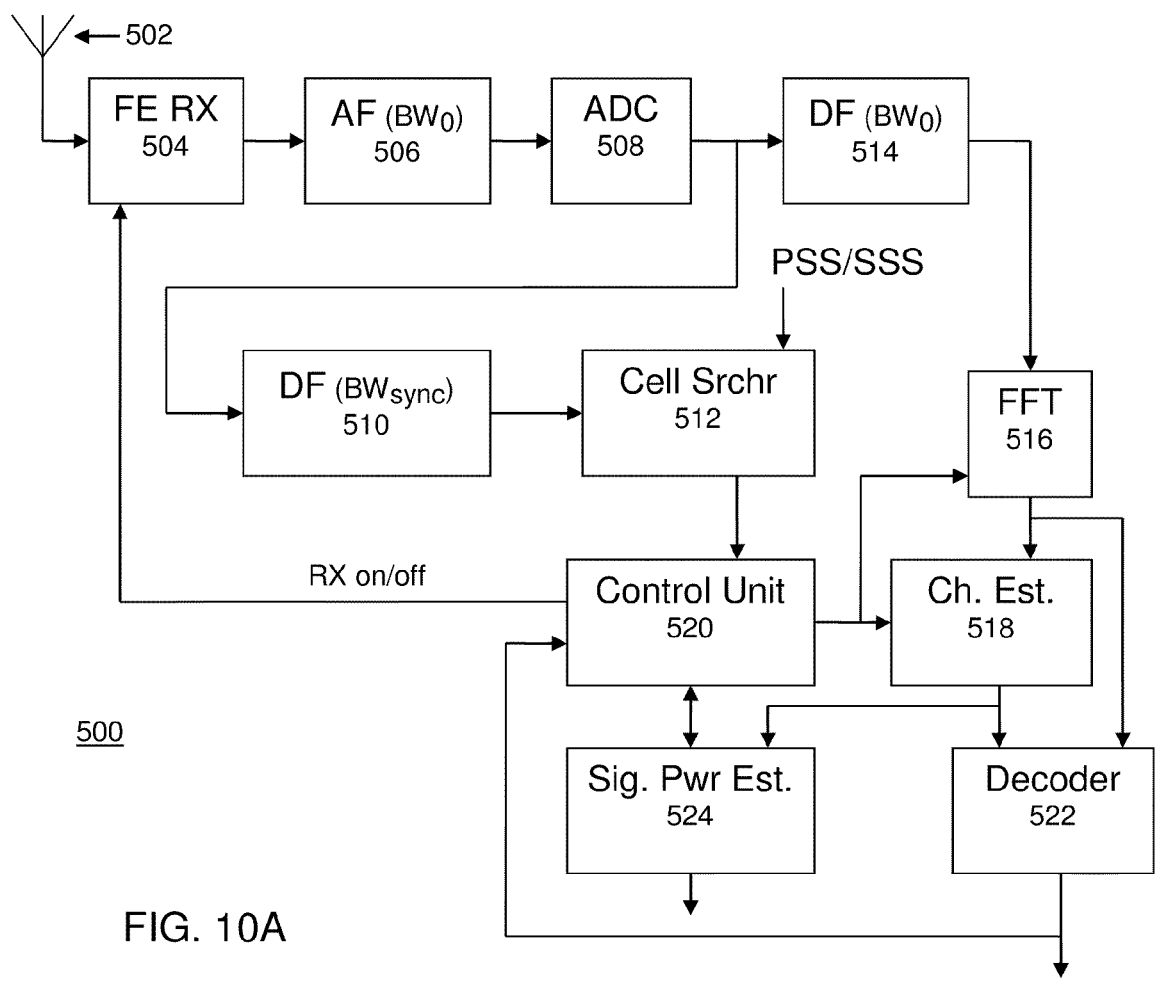
FIG. 10A is a block diagram of an arrangement in a user equipment for a communication network.

FIG. 10A is a block diagram of an arrangement 500 in a UE that can implement the methods described above. It will be appreciated that the functional blocks depicted in FIG. 10A can be combined and re-arranged in a variety of equivalent ways, and that many of the functions can be performed by one or more suitably programmed digital signal processors. Moreover, connections among and information provided or exchanged by the functional blocks depicted in FIG. 10A can be altered in various ways to enable a UE to implement other methods involved in the operation of the UE.

As depicted in FIG. 10A, a UE receives a DL radio signal through an antenna 502 and typically down-converts the received radio signal to an analog baseband signal in a front end receiver (Fe RX) 504. The baseband signal is spectrally shaped by an analog filter 506 that has a bandwidth $BW_0$, and the shaped baseband signal generated by the filter 506 is converted from analog to digital form by an analog-to-digital converter (ADC) 508.

The digitized baseband signal is further spectrally shaped by a digital filter 510 that has a bandwidth $BW_{sync}$, which corresponds to the bandwidth of synchronization signals or symbols included in the DL signal. The shaped signal generated by the filter 510 is provided to a cell search unit 512 that carries out one or more methods of searching for cells as specified for the particular communication system, e.g., LTE. Typically, such methods involve detecting predetermined primary and/or secondary synchronization channel (P/S-SCH) signals in the received signal.

The digitized baseband signal is also provided by the ADC 508 to a digital filter 514 that has the bandwidth $BW_0$, and the filtered digital baseband signal is provided to a processor 516 that implements a fast Fourier transform (FFT) or other suitable algorithm that generates a frequency-domain (spectral) representation of the baseband signal. A channel estimation unit 518 receives signals from the processor 516 and generates a channel estimate $H_{i,j}$ for each of several subcarriers i and cells j based on control and timing signals provided by a control unit 520, which also provides such control and timing information to the processor 516.

The estimator 518 provides the channel estimates $H_j$ to a decoder 522 and a signal power estimation unit 524. The decoder 522, which also receives signals from the processor 516, is suitably configured to extract information from RRC or other messages as described above and typically generates signals subject to further processing in the UE (not shown). The estimator 524 generates received signal measurements (e.g., estimates of RSRP, received subcarrier power, signal to interference ratio (SIR), etc.). The estimator 524 can generate estimates of RSRP, RSRQ, received signal strength indicator (RSSI), received subcarrier power, SIR, and other relevant measurements, in various ways in response to control signals provided by the control unit 520. Power estimates generated by the estimator 524 are typically used in further signal processing in the UE.

The estimator 524 (or the searcher 512, for that matter) is configured to include a suitable signal correlator for handling reference and other signals.

In the arrangement depicted in FIG. 10A, the control unit 520 keeps track of substantially everything needed to configure the searcher 512, processor 516, estimation unit 518, and estimator 524. For the estimation unit 518, this includes both method and cell ID (e.g., for reference signal extraction and cell-specific scrambling of reference signals). Communication between the searcher 512 and the control unit 520 includes cell ID and, for example, cyclic prefix configuration.

The control unit 520 determines which estimation method is used by the estimator 518 and/or by the estimator 524 for measurements on the detected cell(s) as described above. In particular, the control unit 520, which typically can include a correlator or implement a correlator function, can receive information signaled by the eNB and can control the on/off times of the Fe RX 504 as described above.

Figure 10B:
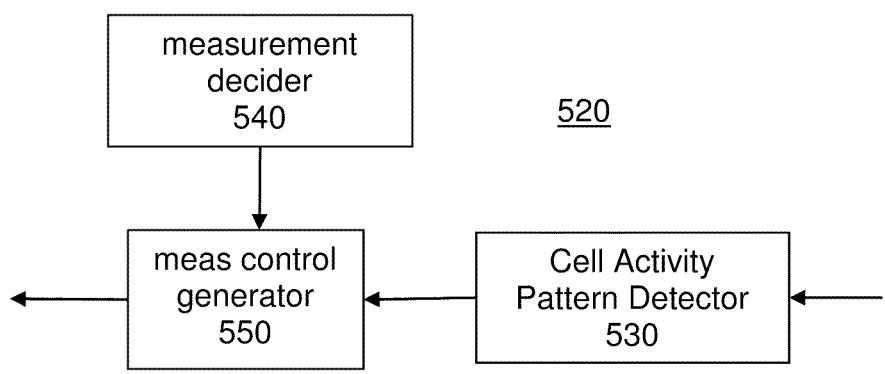
FIG. 10B is a block diagram of a control unit for reducing measurement interference in a user equipment.

FIG. 10B is a more detailed block diagram of an example of a control unit 520 in accordance with this invention. As depicted in FIG. 10B, the control unit 520 is generally an electronic signal processor that is configured to include a detector 530 for determining a cell activity pattern that locates received transmission resources having reduced transmission activity that occur at varying times in the temporal succession on the carrier. The control unit 520 is further configured to include a decision block 540 configured for deciding whether to perform a measurement on a received transmission resource based on the determined cell activity pattern, and a measurement control signal generator 550 configured for causing the UE, in particular for example the estimator 524, to perform the measurement according to the decision by the block 540.

As described above, the detector 530 can be configured to determine the cell activity pattern by at least determining at least one of a pattern length, periodicity, cyclic shift, bandwidth, carrier, activation point, and re-activation periodicity. The pattern can be predefined, and so the detector 530 can simply retrieve the pattern characteristics from a suitable storage device (not shown), or the detector can determine the pattern based on information in a signal received by the UE from another node, such as an eNB. Also, the detector 530 can be configured to include a timer or a counter that determines activation and re-activation points and cyclic shifts of a cell activity pattern that results in varying temporal locations of the transmission resource(s) having reduced transmission activity. The cell activity pattern can correspond to at least one of the communication network and the carrier, as described above.

The decision block 540 can be configured for evaluating a predetermined pseudo-randomization function at a transmission position of an identified resource block, and comparing the function value to a predetermined threshold. As a result of such operations, which can be considered optional, the decision block 540 can locate pseudo-randomly determined transmission resources having reduced transmission activity.

The generator 550 can cause the UE either to perform the received signal measurement during a time that the transmission resources have reduced transmission activity, or to perform the received signal measurement during a time that the transmission resources do not have reduced transmission activity. The received signal measurement can be at least one of RSRP, RSRQ, and CSI. The generator 550 can also be configured to generate a report of the received signal measurement.

The control unit and other blocks of the UE can be implemented by one or more suitably programmed electronic processors, collections of logic gates, etc. that processes information stored in one or more memories. The stored information can include program instructions and data that enable the control unit to implement the methods described above. It will be appreciated that the control unit typically includes timers, etc. that facilitate its operations.

It will be appreciated that the methods and devices described above can be combined and re-arranged in a variety of equivalent ways, and that the methods can be performed by one or more suitably programmed or configured digital signal processors and other known electronic circuits (e.g., discrete logic gates interconnected to perform a specialized function, or application-specific integrated circuits). Many aspects of this invention are described in terms of sequences of actions that can be performed by, for example, elements of a programmable computer system. UEs embodying this invention include, for example, mobile telephones, pagers, headsets, laptop computers and other mobile terminals, and the like. Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

It will be appreciated that procedures described above are carried out repetitively as necessary, for example, to respond to the time-varying nature of communication channels between transmitters and receivers. In addition, it will be understood that the methods and apparatus described here can be implemented in various system nodes.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless devices implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a storage medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

What is claimed is:

1. A method of controlling transmission resources in a macro transmitting node for a hierarchical radio communication network, in which transmission resources are organized in a temporal succession on a carrier, the method comprising:

the macro transmitting node transmitting normal transmission resources and reduced transmission resources according to a pattern such that the reduced transmission resources occur at varying predictable times in the temporal succession;

wherein the pattern is a first pattern of the normal and reduced transmission resources during a first time period; the first pattern having a first length;

wherein the pattern is a second pattern of the normal and reduced transmission resources in a second time period immediately subsequent to the first time period, the second pattern being a cyclic shift in time of the first pattern by an amount other than an integer multiple of the first length;

wherein the first time period and the second time period have respective lengths that are at least twice the first length such that the first and second patterns are repeated during the first and second time periods, respectively;

wherein transmission activity of reduced transmission resources is reduced with respect to transmission activity of normal transmission resources.

2. The method of claim 1, further comprising selecting the pattern by determining at least one of a pattern length, periodicity, cyclic shift, bandwidth, activation point, and re-activation periodicity.

3. The method of claim 1, wherein selected transmission resources occur at pseudo-random times in the temporal succession.

4. The method of claim 3, wherein the pseudo-random times are determined by evaluating a pseudo-randomization function and comparing a respective function value for each pseudo-random time to a threshold.

5. The method of claim 1, wherein the pattern corresponds to an indicator of at least one of the communication network, the transmitting node, and the carrier.

6. The method of claim 1, wherein the pattern is predefined in the transmitting node.

7. The method of claim 1, further comprising indicating the pattern to another node of the communication network.

8. The method of claim 1, wherein the carrier is an orthogonal frequency division multiplex (OFDM) carrier, and each selected transmission resource is a respective subframe on the OFDM carrier.

9. The method of claim 1, wherein the carrier is an orthogonal frequency division multiplex (OFDM) carrier, and each selected transmission resource is at least one of a respective resource block, a respective set of OFDM symbols, and a respective set of OFDM subcarriers.

10. The method of claim 9, wherein the selected transmission resources occur on varying OFDM subcarriers.

11. The method of claim 1, wherein the temporal succession includes a succession of subframes, and the varying predictable times of the selected transmission resources occur by changing the pattern according to an elapsed time period or a subframe count.

12. The method of claim 1, wherein a transmission resource selected for reduced transmission activity has either a reduced or substantially zero transmission power level.

13. The method of claim 1, further comprising transmitting the temporal succession including the selected transmission resources.

14. An arrangement in a macro transmitting node for controlling transmission resources of the macro transmitting node for a hierarchical radio communication network, in which transmission resources are organized in a temporal succession on a carrier, the arrangement comprising:
  an electronic processor circuit of the macro transmitting node configured to cause transmission of normal transmission resources and reduced transmission resources according to a pattern such that the reduced transmission resources occur at varying predictable times in the temporal succession;
  wherein the pattern is a first pattern of the normal and reduced transmission resources during a first time period, the first pattern having a first length;
  wherein the pattern is a second pattern of the normal and reduced transmission resources during a second time period immediately subsequent to the first time period, the second pattern being a cyclic shift in time of the first pattern by an amount other than an integer multiple of the first length;
  wherein the first time period and the second time period have respective lengths that are at least twice the first length such that the first and second patterns are repeated during the first and second time periods, respectively;
  wherein transmission activity of reduced transmission resources is reduced with respect to transmission activity of normal transmission resources.

15. The arrangement of claim 14, wherein the electronic processor circuit is further configured to select the pattern by determining at least one of a pattern length, periodicity, cyclic shift, bandwidth, activation point, and re-activation periodicity.

16. The arrangement of claim 14, wherein selected transmission resources occur at pseudo-random times in the temporal succession.

17. The arrangement of claim 16, wherein the electronic processor circuit is configured to determine the pseudo-random times by evaluating a pseudo-randomization function and comparing a respective function value for each pseudo-random time to a threshold.

18. The arrangement of claim 14, wherein the electronic processor circuit is configured to determine an indicator of at least one of the communication network, the transmitting node, and the carrier, and to determine the pattern corresponding to the indicator.

19. The arrangement of claim 14, wherein the pattern is predefined for the transmitting node.

20. The arrangement of claim 14, wherein the electronic processor circuit is further configured to indicate the pattern to another node of the communication network.

21. The arrangement of claim 14, wherein the carrier is an orthogonal frequency division multiplex (OFDM) carrier, and each selected transmission resource is a respective subframe on the OFDM carrier.

22. The arrangement of claim 14, wherein the carrier is an orthogonal frequency division multiplex (OFDM) carrier, and each selected transmission resource is at least one of a respective resource block, a respective set of OFDM symbols, and a respective set of OFDM subcarriers.

23. The arrangement of claim 22, wherein the selected transmission resources occur on varying OFDM subcarriers.

24. The arrangement of claim 14, wherein the temporal succession includes a succession of subframes, and the varying predictable times of the selected transmission resources occur by changing the pattern according to an elapsed time period or a subframe count.

25. The arrangement of claim 14, wherein a transmission resource selected for reduced transmission activity has either a reduced or substantially zero transmission power level.

26. The arrangement of claim 14, further comprising a transmitter configured for transmitting the temporal succession including the selected transmission resources.

27. A method of reducing measurement interference in a receiving node for a hierarchical radio communication network, in which received transmission resources are organized in a temporal succession on a carrier, comprising:
  a mobile radio communication device identifying a cell activity pattern of transmission resources comprising normal transmission resources and reduced transmission resources that occur at varying predictable times in the temporal succession on the carrier;
  the mobile radio communication device deciding whether to perform a measurement on a received transmission resource according to the cell activity pattern; and
  the mobile radio communication device performing the measurement on the received transmission resource according to the decision;
  wherein the cell activity pattern, during a first time period, is a first pattern of the normal and reduced transmission resources, the first pattern having a first length;
  wherein the cell activity pattern, during a second time period immediately subsequent to the first time period, is a second pattern of the normal and reduced transmission resources; the second pattern being a cyclic shift in time of the first pattern by an amount other than an integer multiple of the first length;

wherein the first time period and the second time period have respective lengths that are at least twice the first length such that the first and second pattern are repeated during the first and second period, respectively;

wherein transmission activity of the reduced transmission resources is reduced with respect to transmission activity of the normal transmission resources.

28. The method of claim 27, wherein determining the cell activity pattern includes determining at least one of a pattern length, periodicity, cyclic shift, bandwidth, carrier, activation point, and re-activation periodicity.

29. The method of claim 27, wherein determining the cell activity pattern includes receiving a signal that indicates the cell activity pattern, and determining the cell activity pattern based on the signal.

30. The method of claim 27, wherein the cell activity pattern corresponds to an indicator of at least one of the communication network and the carrier.

31. The method of claim 27, wherein the received signal measurement is performed during a time that the transmission resources have reduced transmission activity.

32. The method of claim 27, wherein the received signal measurement is performed during a time that the transmission resources do not have reduced transmission activity.

33. The method of claim 27, wherein the received signal measurement is at least one of reference signal received power, reference signal received quality, and channel state information.

34. The method of claim 27, further comprising reporting the received signal measurement.

35. An arrangement for reducing measurement interference in a receiving node for a hierarchical radio communication network, in which received transmission resources are organized in a temporal succession on a carrier, comprising:
an electronic processor circuit configured to:
identify a cell activity pattern of transmission resources comprising normal transmission resources and reduced transmission resources that occur at varying predictable times in the temporal succession on the carrier;
decide whether to perform a measurement on a received transmission resource according to the cell activity pattern;
perform the measurement on the received transmission resource according to the decision;
wherein the cell activity pattern, during a first time period, is a first pattern of the normal and reduced transmission resources, the first pattern having a first length;
wherein the cell activity pattern, during a second time period immediately subsequent to the first time period, is a second pattern of the normal and reduced transmission resources; the second pattern being a cyclic shift in time of the first pattern by an amount other than an integer multiple of the first length;

wherein the first time period and the second time period have respective lengths that are at least twice the first length such that the first and second pattern are repeated during the first and second period, respectively;

wherein transmission activity of the reduced transmission resources is reduced with respect to transmission activity of the normal transmission resources.

36. The arrangement of claim 35, wherein the electronic processor circuit is configured for determining the cell activity pattern by at least determining at least one of a pattern length, periodicity, cyclic shift, bandwidth, carrier, activation point, and re-activation periodicity.

37. The arrangement of claim 35, wherein the electronic processor circuit is configured for determining the cell activity pattern by at least receiving a signal that indicates the cell activity pattern, and determining the cell activity pattern based on the signal.

38. The arrangement of claim 35, wherein the cell activity pattern corresponds to an indicator of at least one of the communication network and the carrier.

39. The arrangement of claim 35, wherein the electronic processor circuit is configured for causing the receiving node to perform the received signal measurement during a time that the transmission resources have reduced transmission activity.

40. The arrangement of claim 35, wherein the electronic processor circuit is configured for causing the receiving node to perform the received signal measurement during a time that the transmission resources do not have reduced transmission activity.

41. The arrangement of claim 35, wherein the received signal measurement is at least one of reference signal received power and reference signal received quality.

42. The arrangement of claim 35, wherein the electronic processor circuit is further configured for causing the receiving node to generate a report of the received signal measurement.

43. The arrangement of claim 35, wherein the arrangement is included in a user equipment, a relay node, or a femto base station.

44. The method of claim 27, wherein performing the measurement comprises measuring the received transmission resource when the received transmission resource is a reduced transmission resource in order to obtain a measurement corresponding to an underlying cell.

45. The arrangement of claim 35, wherein the electronic processor circuit is further configured to measure the received transmission resource when the received transmission resource is a reduced transmission resource in order to obtain a measurement corresponding to an underlying cell.

* * * * *

UNITED STATES PATENT AND TRADEMARK OFFICE
CERTIFICATE OF CORRECTION

PATENT NO. : 8,638,868 B2  
APPLICATION NO. : 13/163876  
DATED : January 28, 2014  
INVENTOR(S) : Larsson et al.

It is certified that error appears in the above-identified patent and that said Letters Patent is hereby corrected as shown below:

In the Specification

In Column 11, Line 48, delete " $c(i+\lfloor_1 n_{frame}+k_2 n_{subframe}\rfloor)=c(n)$ " and insert -- $c(i+\lfloor k_1 n_{frame}+k_2 n_{subframe}\rfloor)=c(n)$ --, therefor.

Signed and Sealed this  
Eighth Day of July, 2014

Michelle K. Lee  
*Deputy Director of the United States Patent and Trademark Office*